(12) United States Patent
Hazaka

(10) Patent No.: US 6,316,246 B1
(45) Date of Patent: *Nov. 13, 2001

(54) METHOD FOR TREATING ORGANIC WASTE MATTER

(76) Inventor: Masaru Hazaka, 88-1, Aza-Otsukishita, Oaza-Murata, Muratacho, Shibata-gun, Miyagi 989-1305 (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,465

(22) Filed: Jun. 21, 1999

(30) Foreign Application Priority Data

Feb. 8, 1999 (JP) .................................................. 11-029711

(51) Int. Cl.$^7$ ............................. C05F 3/00; C12S 13/00
(52) U.S. Cl. ...................... 435/262; 435/267; 435/290.4; 71/8
(58) Field of Search .................................... 435/262, 267, 435/262.5, 290.1, 290.2, 290.4; 71/8–10; 366/345, 346; 210/601, 603, 609, 610, 615

(56) References Cited

U.S. PATENT DOCUMENTS 5,149,196 * 9/1992 Piacentino et al. .

FOREIGN PATENT DOCUMENTS

| 0 112 996 | 7/1984 | (EP) . |
|---|---|---|
| 0 458 738 | 11/1991 | (EP) . |
| 2 767 819 | * 3/1999 | (FR) . |
| 61-97182-A | * 5/1986 | (JP) . |
| 7-133177 | 5/1995 | (JP) . |
| 9-188586 | 7/1997 | (JP) . |
| 09-208354 | 8/1997 | (JP) . |
| 10-94779 | 4/1998 | (JP) . |
| 10-114591 | 5/1998 | (JP) . |
| 11-29381 | 2/1999 | (JP) . |

* cited by examiner

*Primary Examiner*—William H. Beisner
(74) *Attorney, Agent, or Firm*—Oblon, Spivak, McClelland, Maier & Neustadt, P.C.

(57) ABSTRACT

The present invention provides a method for treating organic waste matter in a fermentation container having a shoveling conveyor, comprising the steps of: a) depositing or showering organic waste matter into an entry port of the fermentation container which contains at least one of crushed wooden materials and natural fibers, and incinerated ash thereof; b) transporting the organic waste matter toward an exit port of the fermentation container by the shoveling conveyor; c) unloading the treated matter from the container at the exit port; and d) redepositing the treated matter into the container at the entry port together with untreated organic waste matter. According to the present invention, organic solid waste matter does not overflow the container. Accordingly, there is no need of post-treatment of organic solid waste matter.

4 Claims, 3 Drawing Sheets

METHOD FOR TREATING ORGANIC WASTE MATTER

FIELD OF THE INVENTION

The present invention relates to a method for treating organic waste matter. The method is effective in reducing the organic waste matter in a shorter period of time and thus contributes to the so-called pollution control.

BACKGROUND OF THE INVENTION

Organic waste matter such as sludge, garbage and residues is one of today's major problems. It causes marine pollution, groundwater pollution, and eutrophication in rivers and lakes, as well as contamination of air and soil by environmental hormones such as dioxin, etc.

Significantly large plant and equipment investment is required to incinerate, melt or bury the sludge of sewage water which contains a large amount of hazardous heavy metals such as mercury and cadmium.

Currently used sludge treatment systems include, for example, the dehydration-drying-incineration system, the dehydration-drying-melting system or the dehydration-fermentation system. However, all of these systems leave residues such as incinerated ash, melted residues and/or residues containing hazardous heavy metals. Accordingly, a method for treating these final products has been required.

In order to solve this problem, the present inventor developed a method for fermenting organic waste by fermenting the organic waste and adding vegetal sludge thereto. See Japanese Patent Publication (Kokoku) No. 8-744.

Yet, there has been a demand for a method for treating organic waste matter which renders post-treatment unnecessary by reducing the amount of treatment residues.

SUMMARY OF THE INVENTION

The object of the invention is to provide a method for treating organic waste matter which does not require post-treatment of treatment residues.

The present inventor has now found an effective method for treating organic waste matter to solve the above-mentioned problems.

In one of the present invention, a method for treating organic waste matter in a fermentation container having a shoveling conveyor includes the steps of a) depositing or showering organic waste matter into an entry port of the fermentation container which contains at least one of crushed wooden materials and natural fibers, and incinerated ash thereof; b) transporting the organic waste matter toward an exit port of the fermentation container by the shoveling conveyor; c) unloading the treated matter from the container at the exit port; and d) redepositing the treated matter into the container at the entry port together with untreated organic waste matter.

According to one embodiment of the present invention, when the organic waste matter is in a liquid form, it is showered in the vicinity of the center of the fermentation container.

DETAILED DESCRIPTION OF THE INVENTION

The present invention is described in more detail below.

Figure 1:
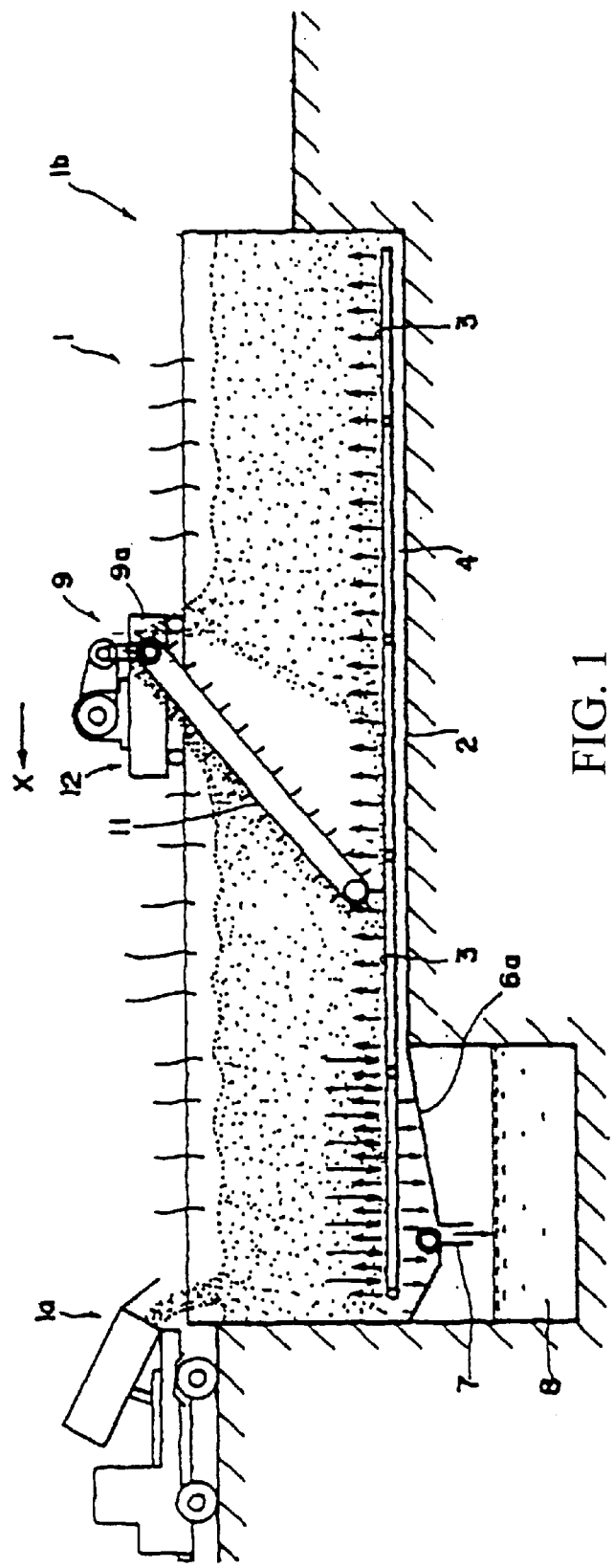
FIG. 1 is a cross-sectional view of a fermentation container 1 of the present invention with an entry port 1a, an exit port 1b, a bottom surface 2, spit holes 3, a vent pipe 4, excess water collecting plates 6a, a drain 7, a water reservoir 8, and a shoveling conveyor 9 with a truck 12 and a bladed endless chain belt 11.
Figure 2:
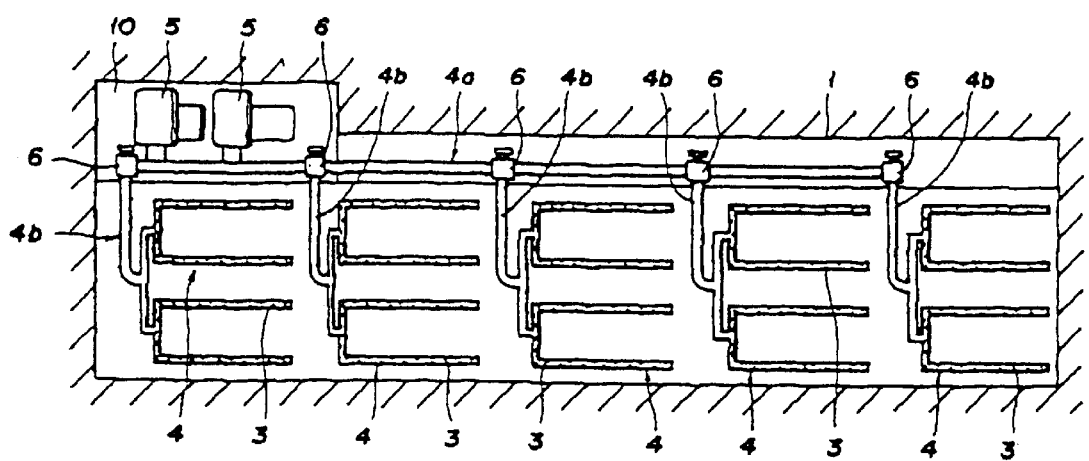
FIG. 2 is a plan view of the fermentation container 1 of the present invention showing vent pipe members 4a and 4b, fans 5 with compressors, and valves 6.

Referring to FIG. 1, first, an appropriate amount of crushed wooden materials such as trimmed-off twigs, bark, sawdust, pulled-out roots, driftwood and husk, crushed natural fibers, and/or incinerated ash thereof are deposited into the fermentation container 1 to make an organic bed.

Then, a shoveling conveyer 9a travels from the exit port 1b to the entry port 1a of the fermentation container 1 to treat the deposited (stacked) materials within the container 1. Thereafter, the treated materials are unloaded at the exit port 1b and redeposited into the fermentation container 1 at the entry port 1a together with untreated organic waste matter.

Herein, the phrase "(re)deposit the treated materials together with untreated organic waste matter" means that the treated materials (i.e., final products) and untreated organic waste matter may be premixed before depositing them into the fermentation container 1, or that they may be deposited simultaneously and then mixed in the fermentation container 1.

When the organic waste matter is in a liquid form (e.g., urine), it is preferably showered directly in the vicinity of the center of the fermentation container 1.

The deposition is preferably performed once a day, though it is within one's discretion to select the number of deposition per day depending on the type and amount of the waste matter to be deposited.

The shoveling conveyor 9 is operated to transport the organic waste matter from the entry port 1a to the exit port 1b in order to enhance the fermentation and decomposing activities.

The term "shoveling" as used herein refers to mixing the contents in the fermentation container 1 by shifting the waste matter in the lower portion to the upper portion of the container 1, or by stirring them.

The contents unloaded at the exit port 1b are redeposited into the container 1 at the entry port 1a together with untreated organic waste matter. The present invention is characterized by repeating the entire cycle described above.

Depositing, unloading, or redepositing may be performed manually or by using a machine such as a conveyor.

By such procedure, untreated organic waste matter is fermented and decomposed into $CO_2$ and water within the fermentation container 1. Since the resulting water is vaporized and dispersed with the resulting $CO_2$ in the air, the organic waste matter may eventually disappear.

Accordingly, organic waste matter can be treated by simply depositing untreated organic waste matter into the fermentation container 1 everyday. After the deposition, the organic waste matter is incorporated into the treatment cycle, whereby it disappears or diminishes. The remaining treated matter, if any, is inorganic waste matter.

Herein, the term "a treatment cycle" refers to a cycle of treating waste matter including the steps of depositing the waste matter at the entry port 1a, conveying the waste matter towards the exit port 1b, unloading the treated waste from the exit port 1b, and redepositing the treated waste at the entry port 1a together with untreated waste matter.

"Hazaka Plant" will be explained below as an example of fermentation containers used with the present invention. The "Hazaka Plant" was developed by the present inventor with a grant from the Ministry of Agriculture, Forestry and Fisheries.

The term "form-controlled waste matter" used herein refers to a mixture whose moisture content is controlled by mixing the recyclable bed material such as wooden materials pre-treated in the container 1 with untreated organic waste matter so that the mixture forms into granules or aggregates.

The fermentation container 1 has a predetermined length between the entry port 1a and the exit port 1b. A bottom surface 2 is provided with a vent pipe 4 through which surface spit holes 3 are punched substantially along its longitudinal axis. The vent pipe 4 is connected to fans 5 with compressors.

The fermentation container 1 is also provided with a shoveling conveyor 9 which conveys the form-controlled waste matter in the fermentation container 1 toward the exit port 1b while shoveling the form-controlled waste matter. The shoveling conveyor 9 is transported by a truck 12 which travels along a traffic lane such as rails or grooves which may be provided along the longitudinal rims of the fermentation container 1.

Figure 3:
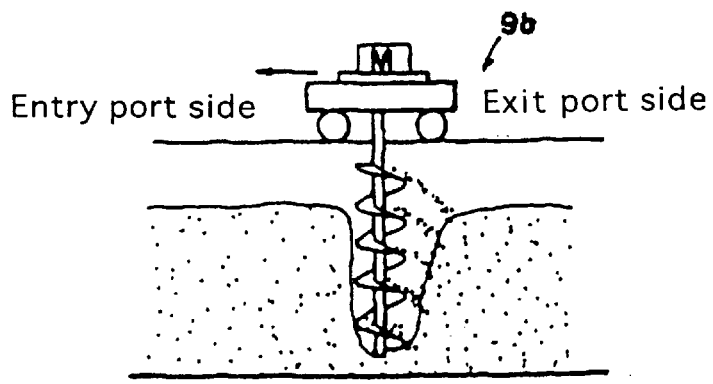
FIG. 3 is a cross-sectional view showing an alternative example of the shoveling conveyor 9.
Figure 4:
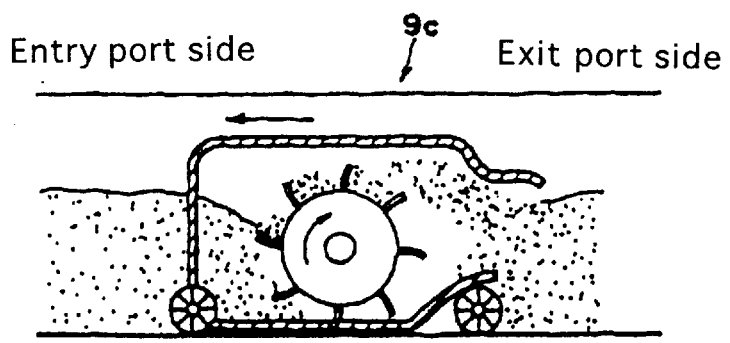
FIG. 4 is a cross-sectional view showing another example of the shoveling conveyor 9.
Figure 5:
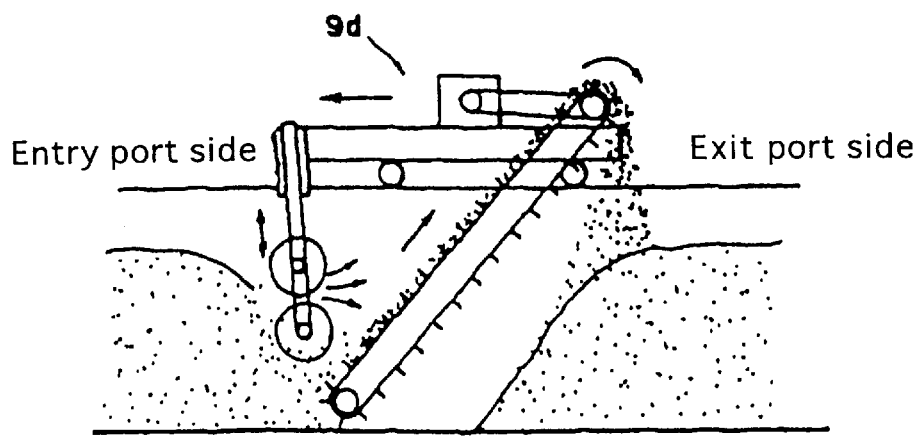
FIG. 5 is a cross-sectional view showing still another example of the shoveling conveyor 9.

The shoveling conveyor 9 may be, for example, a travelling chain scoop type shoveling conveyor 9a (FIG. 1), a travelling screw scoop type shoveling conveyor 9b (FIG. 3), a travelling drum scoop type shoveling conveyor 9c (FIG. 4), or a travelling rotary crusher type shoveling conveyor 9d (FIG. 5).

Specifically, referring to FIG. 1, the shoveling conveyor 9a is provided with the bladed endless chain belt 11 and the truck 12 for supporting and transporting the bladed endless chain belt 11. The shoveling conveyor 9a shovels the form-controlled waste matter in the fermentation container 1 by revolving the bladed endless chain belt 11 which slopes from the bottom to the top of the container. As a result, the form-controlled waste matter is gradually transported from the entry port 1a to the exit port 1b.

The shoveling conveyor 9a shovels and conveys the form-controlled waste matter towards the exit port 1b by travelling from the exit port 1b toward the entry port 1a.

The "prescribed length" of the fermentation container 1 may be given by multiplying the days required for fermenting and decomposing the organic waste matter by the distance the shoveling conveyor 9 travels per day.

For example, according to the examples of the present invention, the organic waste matter is fermented and decomposed in 25 days, and the distance (m) the shoveling conveyor 9 travels is 4 m/day. Therefore, the length of the fermentation container is:

$$25 \times 4 = 100 \text{ (m)}$$

Hereinafter, a method of the present invention will be described by referring to this "Hazaka plant" as an example.

First, a suitable amount of wooden materials and the like are deposited into an empty fermentation container 1 to make an organic bed. The suitable amount of wooden materials is the amount such that the water content of the entire materials deposited is 85% or less.

As described above, the total length of the fermentation container 1 is 100 m, and the shoveling conveyor 9 travels 4 m/day toward the entry port 1a (towards left as indicated by an arrow X in FIG. 1), i.e., the conveyor 9 travels from the exit port 1b to the entry port 1a in 25 days.

Then, the organic bed material (made from wooden materials and the like) is unloaded from the exit port 1b, and deposited again at entry port 1a as a form-controlling material together with untreated organic waste matter. The organic waste matter is deposited everyday.

The form-controlling material helps to reduce the moisture content of the waste matter. For example, waste matter with the moisture content of 70–80% at the entry port 1a may have a reduced moisture content of 60% or less in about 2 days.

Twenty-five days after the first deposition of the untreated waste matter, form-controlled waste matter, i.e., the mixture of the organic waste matter and wooden material, is unloaded at the exit port 1b, the amount thereof equaling the initial amount of the form-controlling material. This unloaded matter is deposited again at the entry port 1a together with untreated organic waste matter.

By repeating the above-mentioned treatment cycle, for example, mixture of 10 $m^3$ of organic waste matter and 10 $m^3$ of form-controlling material (total of 20 $m^3$) deposited at the entry port 1a may be reduced to 10 $m^3$ by the time it reaches the exit port 1b.

Since the form-controlling material essentially remains after such treatment cycles, the reduction of 10 $m^3$ implies elimination of the organic waste matter.

The term "organic waste matter" as used herein includes sludge or wastewater containing hazardous metals from sewerage facilities, manure handling facilities, wastewater disposal facilities and purification containers; livestock manure; fishery product waste matter; remainder waste matter from meat or food processing factories, brewing industries, etc.; garbage from households, schools (esp. from school lunch), restaurants, hotels, supermarkets, department stores, etc.

Examples of hazardous metals include mercury or compounds thereof, cadmium compounds, lead compounds, organic phosphorous compounds and hexavalent chromium compounds.

Although "Hazaka plant" is employed in the examples described herein, the present invention is not limited to "Hazaka plant" and any other fermentation container may be used with the invention as long as the employed fermentation container has the fermenting function equivalent to the "Hazaka plant".

EXAMPLES

Example 1

The fermentation container 1 shown in FIG. 1 was used for a swine manure treating experiment at Sato swine housing, Ltd. (Miyagi, Japan).

Approximately 20 tons of raw swine manure was deposited into the fermentation container 1 everyday. Specifically, swine feces was deposited at the entry port 1a for primary fermentation and urine was showered in the vicinity of the center of the bed for secondary fermentation. The treatment cycle was repeated for one and a half year, yet there was no compost to be unloaded. When raw feces was mixed with sawdust and deposited into the container, compost of about one-third of the amount of the deposited sawdust was produced.

It was revealed that the fermentation container 1 according to the invention decomposed raw feces and urine into gas through the treatment cycles, leaving small amount of organic solid.

Example 2

A poultry manure treating experiment was conducted likewise as Example 1, at Akita Poulterer, Ltd. (Akita, Japan).

Twenty $m^3$ of poultry manure was deposited everyday to be treated through the fermentation cycles. A total of over 14,000 $m^3$ poultry manure had been deposited for 2 years but a considerable amount of compost was not present in the fermentation container. The experiment was continued for three and a half years and so far a total of about 26,000 $m^3$ poultry manure has been deposited. Still, a significant amount of compost has not been obtained.

This proves that the poultry manure was decomposed into gas through the treatment cycles.

Example 3

A dehydrated sewer sludge treating experiment was conducted likewise as Example 1 at Kennan Eisei Kogyo Co. (Miyagi, Japan).

For ten years or so, only dehydrated sludge from sewerage facility (downstream of Abukuma River, Miyagi, Japan) was treated everyday through the treatment cycle of the invention. The amount of solid collected from the fermentation container was not sufficient for use as compost.

Other than the above-described examples, raw materials such as garbage from food factories, branches trimmed off from roadside trees, weeds from riverbed, etc. were fermented for producing a bed. When only organic waste matter was deposited into the container containing such fermented materials, the waste matter was decomposed into gas through the fermentation cycles.

According to the present invention, organic solid waste matter does not overflow the container. Accordingly, there is no need of post-treatment of organic solid waste matter.

What is claimed is:

1. A method for treating organic waste matter in a fermentation container having a shoveling conveyor, comprising the steps of:
   a) depositing organic waste matter into an entry port of the fermentation container which contains at least one of crushed wooden materials and natural fibers, and incinerated ash thereof;
   b) transporting the organic waste matter toward an exit port of the fermentation container by the shoveling conveyor;
   c) unloading the organic matter treated in the fermentation container from the fermentation container at the exit port; and
   d) redepositing the organic matter treated in the fermentation container into the fermentation container at the entry port together with untreated organic waste matter such that the organic waste matter gradually dissipates in the fermentation container.

2. A method for treating organic waste matter according to claim 1, wherein when the organic waste matter is in liquid form, said depositing and redepositing steps comprise showering into a center portion of said fermentation container.

3. A method for treating organic waste matter in a fermentation container having a shoveling conveyor, comprising the steps of:
   depositing organic waste matter into an entry port of the fermentation container which contains at least one of crushed wooden materials and natural fibers, and incinerated ash thereof;
   transporting the organic waste matter toward an exit port of the fermentation container by the shoveling conveyor;
   unloading the organic matter treated in the fermentation container from the fermentation container at the exit port;
   redepositing the organic matter treated in the fermentation container into the fermentation container at the entry port together with untreated organic waste matter and
   repeating the redepositing step such that the organic waste matter gradually dissipates as gases in the fermentation container.

4. A method for treating organic waste matter according to claim 3, wherein when the organic waste matter is in liquid form, said depositing and redepositing steps comprise showering the organic waste matter into a center portion of said fermentation container.

* * * * *